(12) United States Patent
Velayuthaperumal et al.

(10) Patent No.: US 10,915,448 B2
(45) Date of Patent: Feb. 9, 2021

(54) STORAGE DEVICE INITIATED COPY BACK OPERATION

(71) Applicant: Seagate Technology LLC, Cupertino, CA (US)

(72) Inventors: Gomathirajan Authoor Velayuthaperumal, Bangalore (IN); Vijay Nanjunda Swamy, Bangalore (IN)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/106,389

(22) Filed: Aug. 21, 2018

(65) Prior Publication Data

US 2019/0065382 A1 Feb. 28, 2019

Related U.S. Application Data

(60) Provisional application No. 62/548,645, filed on Aug. 22, 2017.

(51) Int. Cl.
*G06F 12/00* (2006.01)
*G06F 13/00* (2006.01)
*G06F 12/0868* (2016.01)

(52) U.S. Cl.
CPC .... *G06F 12/0868* (2013.01); *G06F 2212/202* (2013.01); *G06F 2212/7208* (2013.01)

(58) Field of Classification Search
CPC combination set(s) only.
See application file for complete search history.

(56) References Cited

U.S. PATENT DOCUMENTS

| | | | |
|---|---|---|---|
| 7,350,044 B2 | 3/2008 | Keays | |
| 7,941,586 B2 | 5/2011 | Kim | |
| 8,443,263 B2 | 5/2013 | Selinger et al. | |
| 9,063,878 B2 | 6/2015 | Sabbag et al. | |
| 2009/0164698 A1* | 6/2009 | Ji | G11C 16/10 711/100 |
| 2012/0110244 A1 | 5/2012 | Feeley et al. | |
| 2015/0058701 A1 | 2/2015 | Xing et al. | |
| 2015/0324118 A1* | 11/2015 | McCambridge | G06F 3/0659 710/5 |
| 2018/0181499 A1* | 6/2018 | Branco | H04L 9/0662 |
| 2018/0247947 A1* | 8/2018 | Kanno | H01L 27/1052 |
| 2018/0335963 A1* | 11/2018 | Simionescu | G06F 11/2074 |
| 2018/0341547 A1* | 11/2018 | Bolkhovitin | G11C 29/52 |

* cited by examiner

*Primary Examiner* — Tuan V Thai
(74) *Attorney, Agent, or Firm* — Hall Estill Attorneys at Law (57) ABSTRACT

Method and apparatus for managing data in a data storage system. A storage array controller device is coupled to a plurality of storage devices by an external data path, with the storage devices used for non-volatile memory (NVM) storage of user data from a host. A copy back operation is initiated by issuing a copy back transfer command that identifies a selected data set stored in a source device and a unique identifier (ID) value that identifies a destination device. A peer-to-peer connection is established over the external data path in response to the copy back transfer command so that the selected data set is transferred from the source device to the destination device while bypassing the storage array controller device. Normal data transfers can be carried out between the storage array controller and the respective source and destination devices during the copy back operation.

20 Claims, 6 Drawing Sheets

COPY BACK TRANSFER COMMAND

SOURCE INITIATED COPY BACK

FIG. 6

DESTINATION INITIATED COPY BACK

STORAGE DEVICE INITIATED COPY BACK OPERATION

RELATED APPLICATION

The present application makes a claim of domestic priority to U.S. Provisional Patent Application No. 62/548,645 filed Aug. 22, 2017, the contents of which are hereby incorporated by reference.

SUMMARY

Various embodiments of the present disclosure are generally directed to the management of data in a data storage system.

In some embodiments, a storage array controller device is coupled to a plurality of data storage devices by an external data path, the data storage devices used for non-volatile memory (NVM) storage of user data. A copy back operation is initiated by issuing a copy back command that identifies a selected data set stored in a source data storage device and a unique identifier (ID) value that identifies a destination data storage device. A peer-to-peer connection is established over the external data path so that the selected data set is transferred from the source device to the destination device while bypassing the storage array controller. As desired, normal data transfers can be carried out between the storage array controller device and the respective source and destination devices during the copy back operation.

These and other features which may characterize various embodiments can be understood in view of the following detailed discussion and the accompanying drawings.

DETAILED DESCRIPTION

The present disclosure generally relates to managing data stored in a data storage system, such as but not limited to a multi-device data storage array.

Data storage devices are used to store computerized data such as in the form of addressable blocks. Data storage devices can take a variety of forms such as hard disc drives (HDDs), solid state drives (SSDs), hybrid drives, etc. The devices often include one or more controller circuits and non-volatile memory (NVM). The controller circuits direct the storage of the data blocks to the NVM, and the subsequent reading of the data blocks from the NVM for transfer to a requesting host or other device.

Large scale storage systems may be formed by incorporating a number of data storage devices into a combined memory space referred to as a storage array. A storage array controller device directs data transfers to the storage devices in the array. Data sets may be stored across multiple ones of the storage devices using various data processing techniques such as RAID (redundant array of independent discs), replicated data partitions in an object storage (cloud) environment, etc. These and other techniques can enhance data storage reliability, availability and data transfer capabilities of the system.

A process sometimes referred to as a copy back operation may be carried out from time to time in a storage array to copy or otherwise transfer a data set from one data storage device to another data storage device. Copy back operations can be carried out for a number of reasons, including but not limited to addressing a device failure, performing a reallocation of memory, establishing data redundancy, archiving or otherwise backing up existing data, etc.

In a conventional copy back operation, a data set is copied from a source device to an external cache memory of the array controller device, and the cached data set is thereafter copied from the external cache memory to a destination device. The copy back operation can consume significant system resources, including bandwidth, processing cycles and memory allocation. This is particularly the case when large data sets (including the entire contents of the source device) are being copied.

Various embodiments of the present disclosure are directed to an apparatus and method for managing data in a data storage system. As explained below, some embodiments provide a multi-device data storage array with a storage array controller device and multiple data storage devices.

During a normal mode of operation, the storage array controller device directs data transfers between the data storage devices and a cache memory of the storage array controller device. The data storage devices may be nominally identical, or may be different forms of storage devices including devices with different performance characteristics, media types, etc. At least one of the data storage devices is configured as an initiator capable device.

During a copy back mode of operation, a selected data set is transferred directly from a first storage device to a second storage device. The transfer takes place without intervention by the storage array controller device, other than (in at some cases) to initiate and confirm successful completion of the transfer. The selected data set is transferred using a peer-to-peer connection between the first (source) device and the second (destination) storage device that bypasses the cache memory.

The copy back operation is initiated by providing the initiator capable device with a copy back command. The copy back command identifies the data set to be copied, as well as a destination identifier or address of the destination device. In response, the source storage device retrieves and forwards the selected data set to the destination device over the external path.

In some cases, the storage array controller device may periodically request a status of the transfer of the data set, and may provide a command complete notification to a host once the copy back operation has been completed. Both the copy back operation command and the copy back status command may take the form of SCSI (small computer system interface) commands, or may take some other suitable form. The system may be operated in accordance with the NVMe (Non-Volatile Memory Express) specification so that the memory provided by the storage devices is arranged as a number of NVMe namespaces.

In further embodiments, the storage array controller circuit may periodically receive reliability data from various storage devices, such as in the form of SMART (self-monitoring, analysis and reporting technology) data. At such time that the storage array controller circuit determines that a particular device appears to be degraded and may undergo failure in the near future, the storage array controller circuit may forward the copy back command to an available destination (e.g., spare) device. The destination device, in turn, forwards the copy back command to the degraded source device. As before, a peer-to-peer data transfer between the source and destination devices is carried out.

Figure 1:
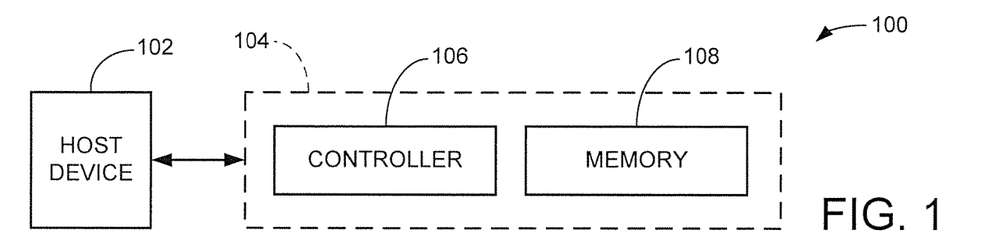
FIG. 1 provides a functional block representation of a data processing system in accordance with various embodiments.

These and other features and advantages of various embodiments can be understood beginning with a review of FIG. 1 which shows a functional block representation of a data processing system 100. The system includes a host device 102 and a data storage device 104. The data storage device 104 includes a controller circuit 106 and a memory module 108.

The controller circuit 106 is a programmable processor and/or hardware based circuit that provides top level communication and control functions for data transfers to and from non-volatile memory (NVM) storage in the memory module 108. The data transfers between the host device and the data storage device may be provided via a selected protocol. The NVM can take any number of forms including solid state memory (e.g., flash, XRAM, RRAM, STRAM, etc.) and/or rotatable media (e.g., magnetic recording discs, etc.).

Figure 2:
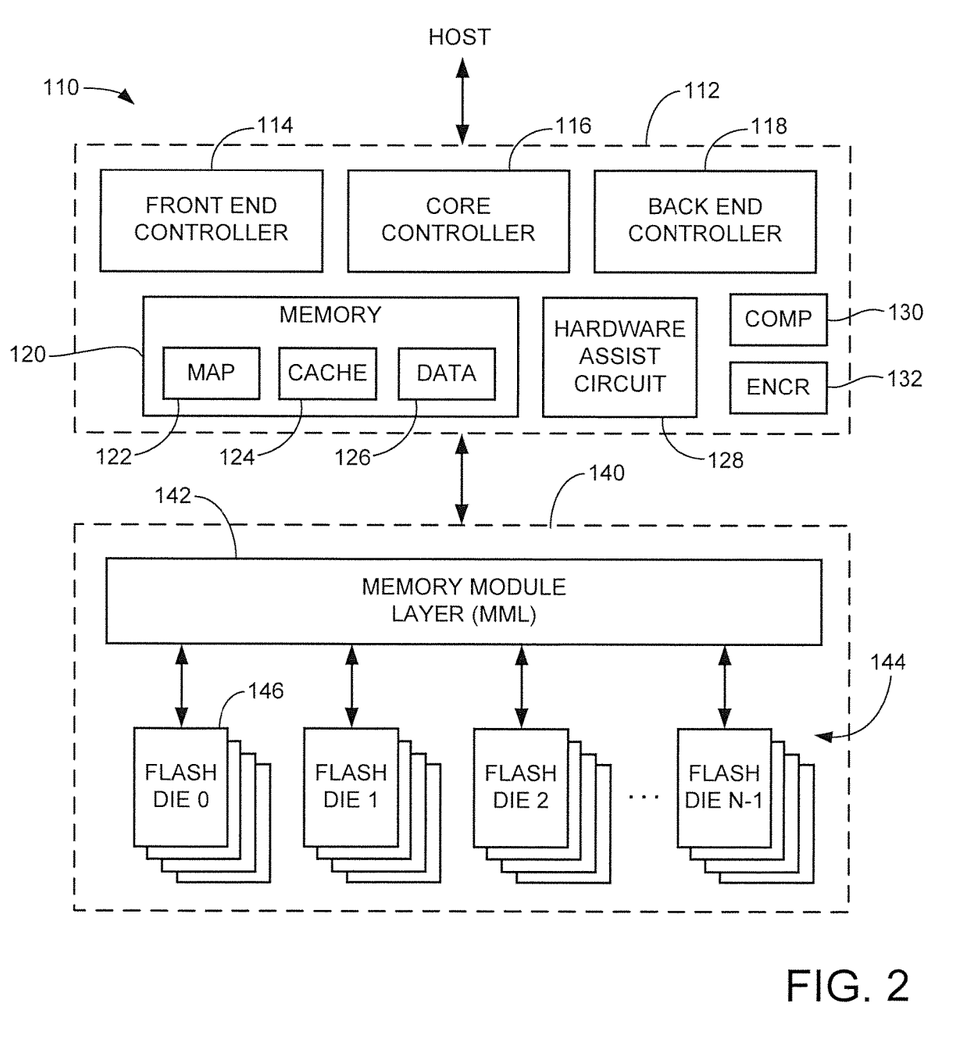
FIG. 2 shows aspects of the device of FIG. 1 characterized as a solid state drive (SSD) in accordance with some embodiments.

FIG. 2 shows a data storage device 110 generally corresponding to the device 104 in FIG. 1. The device 110 is configured as a solid state drive (SSD) that communicates with a host device such as 102 in FIG. 1 via one or more PCIe (Peripheral Component Interface Express) ports. This is merely for purposes of illustration and is not limiting, as the data storage device can take any number of various configurations as required, including an HDD, a hybrid drive, etc., and any number of host interface protocols can be employed.

The SSD 110 includes a controller circuit 112 and a memory module 140. The controller circuit 112 (hereinafter "controller") includes a front end controller 114, a core controller 116 and a back end controller 118. The front end controller 114 performs host I/F functions, the back end controller 118 directs data transfers with the memory module 140 and the core controller 116 provides top level control for the device.

Each controller 114, 116 and 118 includes a separate programmable processor with associated programming (e.g., firmware, FW) in a suitable memory location, as well as various hardware elements to execute data management and transfer functions. This is merely illustrative of one embodiment; in other embodiments, a single programmable processor (or less than three programmable processors) can be configured to carry out each of the front end, core and back end processes using associated FW in a suitable memory location. A pure hardware based controller configuration can also be used. The various controllers may be integrated into a single system on chip (SOC) integrated circuit device, or may be distributed among various discrete devices as required.

A controller memory 120 represents various forms of volatile and non-volatile memory (e.g., SRAM, DDR DRAM, flash, etc.) utilized as local memory by the controller 112. Various data structures and data sets may be stored by the memory including one or more map structures 122, one or more caches 124 for map data and other control information, and one or more data buffers 126 for the temporary storage of host (user) data during data transfers.

A non-processor based hardware assist circuit 128 may enable the offloading of certain memory management tasks by one or more of the controllers as required. The hardware circuit 118 does not utilize a programmable processor, but instead uses various forms of hardwired logic circuitry such as application specific integrated circuits (ASICs), gate logic circuits, field programmable gate arrays (FPGAs), etc.

Additional circuits that form the controller 112 may include a compression circuit 130 to perform data compression/decompression operations, and an encryption engine circuit 132 to perform various cryptographic functions such as encryption, decryption, hashes, signatures, etc. The compression and cryptographic functionality of these circuits may be realized in hardware and/or firmware, and may take various types as required.

FIG. 2 further shows a memory module 140 generally corresponding to the memory 104 in FIG. 1. The memory module 140 includes a memory module layer ("MMl,") and a flash memory array 144. The MML 142 includes read/write/erase (R/W/E) circuitry and other control circuitry incorporated into the memory module 140 to write data to the flash memory 144. The MML may be formed of one or more programmable processor circuits with associated programming in memory, and/or hardware circuits adapted to carry out various commands and data transfers with the controller 112.

The flash memory 144 includes a plural number N flash dies 146 (referred to as die 0 to die N−1) to form a device non-volatile memory (NVM) for the SSD 110. Any number of dies can be used, such as sixteen dies (e.g., N=16, etc.). The MML 142 can operate to carry out parallel data transfer operations along each of the channels (lanes) established with the associated dies 146. Multiple channels may be established with each die (e.g., at a plane level) as required. The flash memory may be arranged as a single storage tier, or as multiple tiers.

Figure 3:
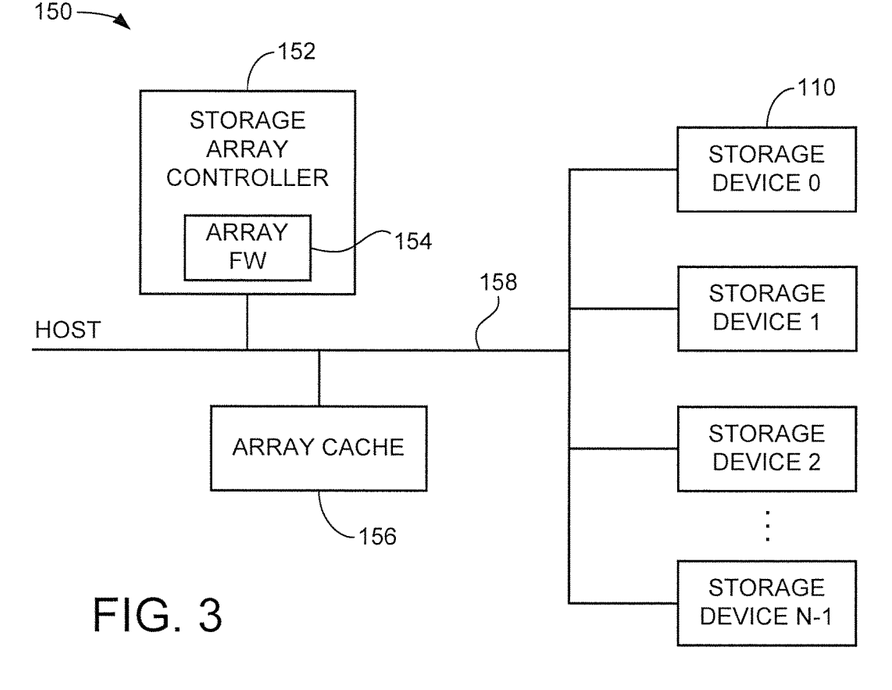
FIG. 3 is a functional block diagram of a storage system (array) constructed and operated in accordance with various embodiments.

FIG. 3 shows a multi-device data storage array 150 formed from a plural number N storage devices 110 from FIG. 2. The storage array 150 includes a storage array controller circuit 152 that provides top level control of data transfers with the flash memory arrays 144 of the SSDs. While not limiting, it is contemplated that the storage array controller circuit 152 includes one or more programmable processors that execute programming (array firmware, FW) stored in a local memory 154 during operation. An array cache 156, also referred to as a cache memory, provides for the temporary storage of data sets between the host and the storage devices 110. For reference, the controller 152, FW 154 and cache 156 may be viewed as a consolidated storage array controller device. An external data path 158 comprises one or more bus structures that operate to facilitate communication of data and commands among the various elements in the array 150. The external data path 158 is also sometimes referred to as a host interface.

The array controller 152 processes various data access commands from the host, such as write and read commands, during what is referred to as a normal mode of operation. During the normal mode, a write command entails the receipt of one or more data sets from the host which are processed as required by the array controller 152 and temporarily stored in the array cache 156 pending transfer to the individual storage devices 110.

To process a read command during normal mode, the array controller 152 receives a request from the host for one or more data sets. The request is formatted as required and forwarded to the appropriate storage devices. The readback data from the storage devices are accumulated and processed in the array cache 156, after which the data sets are returned to the host. Various mapping structures are maintained by the array controller 152 to track the locations of the various data sets in the respective storage devices and the cache.

The data sets may be formed from fixed sized data blocks, such as logical block address units, each having a logical block address (LBA) to uniquely identify the block in the system. Other logical addressing arrangements may be used such as virtual block addresses (VBAs), etc. Exemplary sizes may include 512 bytes (B), 4096 B, etc. The application of data encryption and/or compression at the array controller level may provide data blocks of different sizes.

The data blocks may be arranged into RAID (redundant array of independent discs) data sets so that the data sets are distributed across multiple ones of the storage devices. As known in the art, without limitation the data sets may be written as RAID 0 (striped), RAID 1 (mirrored), RAID 5 (block-level striping with distributed parity), etc. In other cases, the data may be arranged as partitions or objects of selected size (e.g., 5 GB, etc.) and stored in an object-based (cloud) computing environment. The distribution of data sets across multiple devices is contemplated but not necessarily required.

In another embodiment, the storage devices 110 are operated in accordance with the NVMe (Non-Volatile Memory Express) standard, which allows users to access and control different portions of the memory space formed by the NVM of the devices. Each area assigned to a user is referred to as an NVMe namespace. The NVMe namespaces can correspond to all of the flash memory 144 in a single storage device, can use part or all of the flash memory in multiple storage devices, or can comprise a portion of the flash memory of a single device. Granularity is usually at the flash die level, so that a first number of the flash dies 146 (FIG. 2) in a given device may be assigned to a first namespace, a second number of the flash dies may be assigned to a second name space, and so on.

In accordance with various embodiments, the storage devices 110 are configured as initiator capable devices. This enables the storage devices to operate in a copy back mode of operation where various peer-to-peer data transfers can be carried out between the storage devices without need to involve the array controller 152 or the array cache 156. Both normal mode and copy back mode operations can be carried out concurrently.

Figure 4:
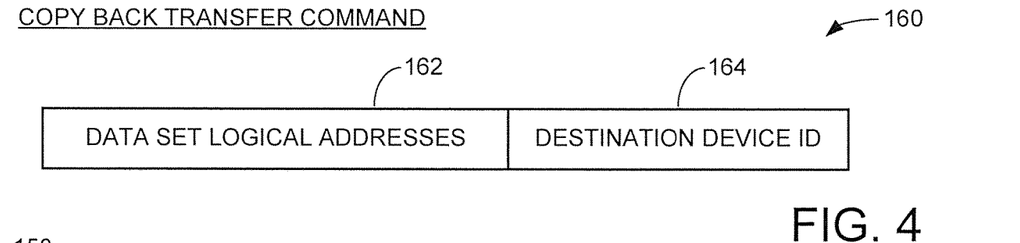
FIG. 4 shows an exemplary format for a copy back transfer command in accordance with some embodiments.

As shown in FIG. 4, one such data transfer is a copy back operation that is carried out responsive to receipt of a copy back transfer command 160, also sometimes referred to as a copy back command. The command may be in the form of a SCSI command depending on the interface protocol used by the array 150. The copy back command includes various components, including a logical range of the data blocks to be accessed (field 162) and a device identifier (ID) value that uniquely identifies a destination device (field 164) to which the data blocks are to be copied. Other formats can be used.

The logical addresses in the command may be a range of logical addresses for a particular data set, or may indicate all of the contents of the associated storage device. The destination ID value may be a worldwide name (WWN), an NVMe namespace value associated with a particular device, an Ethernet address, or some other device ID value. The ID value may be maintained as part of a set of control information in the device NVM and loaded to a local memory for use by the device controller during both normal and copy back modes of operation. Each storage device 110 in FIG. 3 will have a unique ID value used by the storage array controller in identifying the respective storage device.

Figure 5:
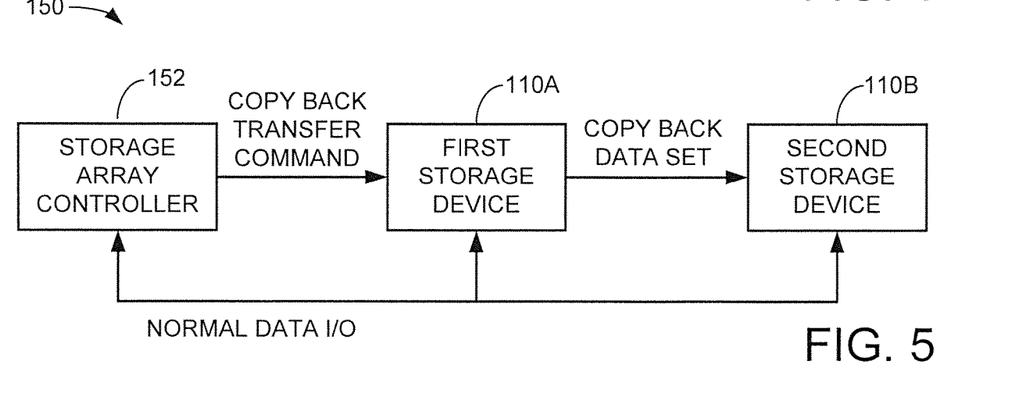
FIG. 5 shows a copy back process in which a data set is transferred from a first (source) storage device directly to a second (destination) storage device of the storage array.

As shown by FIG. 5, the copy back command 160 is issued by the storage array controller 152 to a first storage device 110A, also referred to as the source device. In response to the command, the source device 110A operates to transfer, via an external data path such as 158, the requested data directly to a different, second storage device 110B, also referred to as the destination device.

The copy back data transfer is characterized as being carried out using a peer-to-peer connection between the first and second storage devices 110A, 110B. The copy back command identifies the data resident in the source device that are to be transferred to the destination device via the copy back operation, and the data are transferred directly from the source device to the destination device over the external data path without having the data passing through the array cache 156 and without any additional processing overhead being utilized by the storage array controller 152 (other than to confirm completion of the transfer, etc.).

The copy back processing of FIG. 5 is between different physically distinct storage devices each having a separate front end interface, memory and controller (see FIG. 2), as opposed to an internal data transfer operation within a single device (such as between different dies 146 in a single device, as shown in FIG. 2). Normal data I/O transfers may continue to take place between the storage array controller 152 and the source and destination devices 110A, 110B during the copy back operation.

While normal mode access commands and copy back commands can be serviced concurrently by the same storage device, there are notable differences between servicing a normal mode access command and a copy back command. For example, when servicing a read command during the normal mode, the associated storage device supplies the requested data to the cache memory of the storage array controller device, and may supply other information to the array controller as well such as a command complete notification, etc.

On the other hand, when servicing a copy back command the associated storage device (source device) generally treats the command as a read command, but forwards the retrieved data in the form of a write command to the destination device using the peer-to-peer connection established between the source and destination devices. A separate command complete notification may be issued to the storage array controller device by the source device once the copy back transfer is complete. It will be noted that both the source device and the destination device can service respective normal mode access commands (e.g., read commands, write commands) during a copy back transfer.

Figure 6:
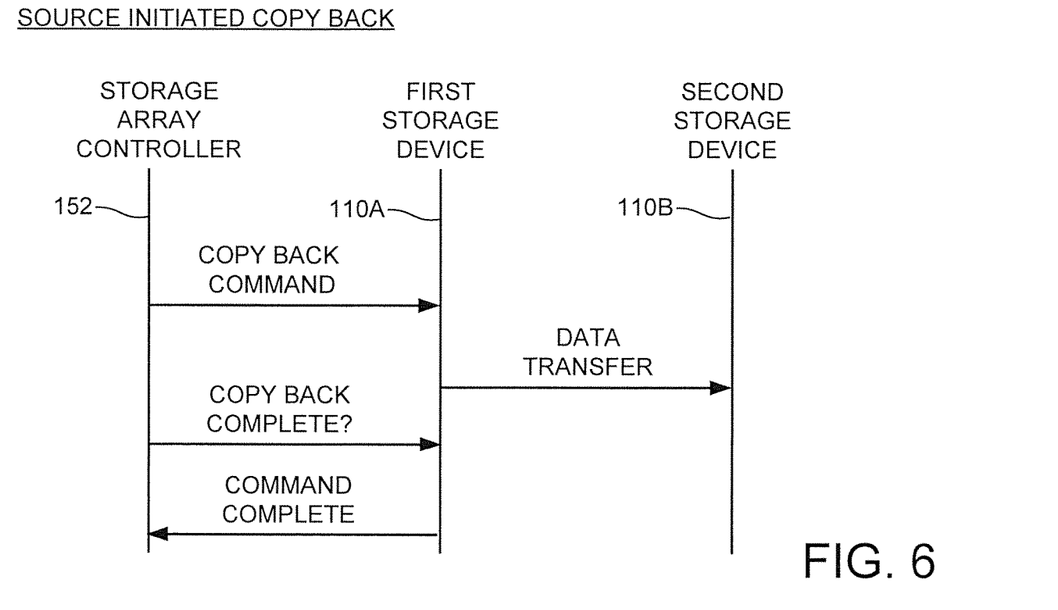
FIG. 6 is a sequence diagram that illustrates a source initiated copy back process in some embodiments.

FIG. 6 shows a sequence diagram for a source initiated copy back operation in accordance with some embodiments. In FIG. 6, the sequence begins with the issuance of a copy back command formatted as shown in FIG. 4 by the storage array controller 152 to the first storage device 110A. The reason for the copy back command can vary; for example, the copy back operation may be initiated as part of the data set processing (e.g., replication, mirroring, etc.). In other cases, the copy back command may be issued based on an indication that the source device is undergoing degraded operation, etc.

Regardless of the reason for the copy back command, once issued the first storage device accesses the local flash array 144, retrieves the requested data, and forwards the data to the destination storage device 110B. The first storage device appends the destination address information to the data sets so that the second storage device 110B receives the data as if the data were being transferred from the storage array controller 152 during a normal write operation. It will be noted that normal internal processing will be carried out by the first storage device (e.g., LDPC decoding, decompression, decryption, etc.) as with a normal host level read command.

In some embodiments, the storage array controller 152 periodically issues a status command to the first storage device 110A to determine the progress that is being made during the transfer. A simple binary response mechanism can be used (e.g., the first storage device either responds with "not complete" or "complete"). In such case, the array controller 152 can continue to query the status until a complete status is received. In other embodiments, the storage device can provide an estimated progress value. In still other embodiments, the storage device can be configured to forward a command complete status to the array controller at the completion of the transfer. In yet further embodiments, the destination (second) storage device 110B can be used to issue the command complete status.

Figure 7:
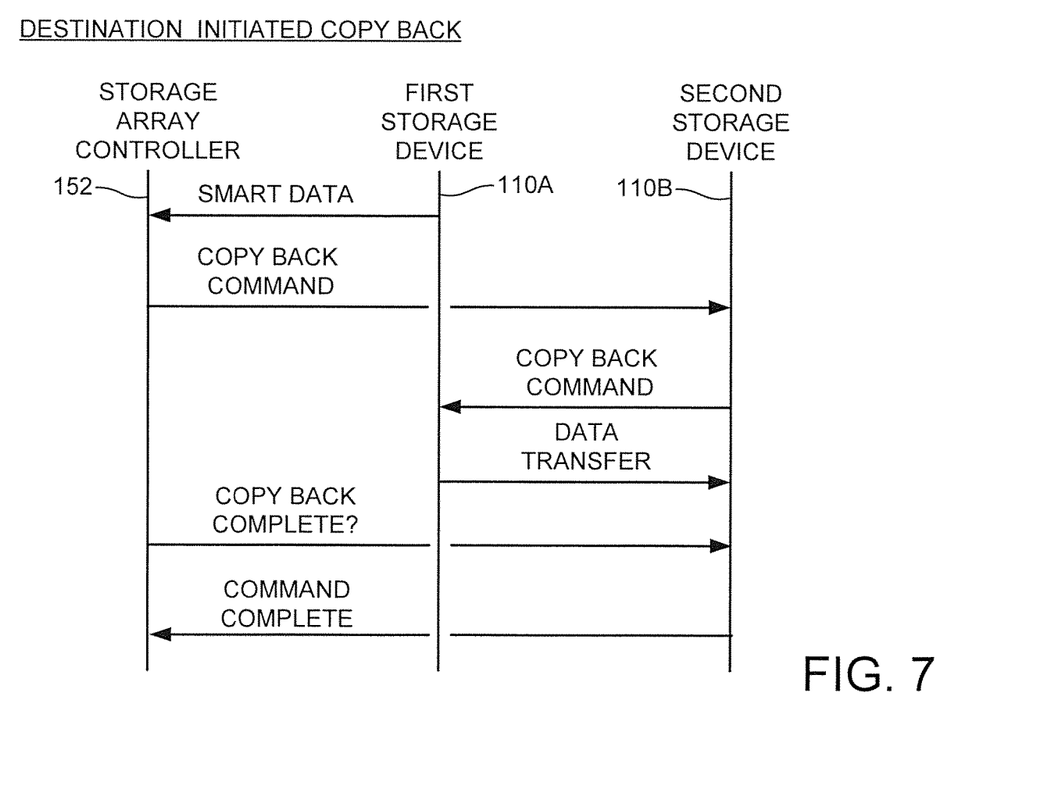
FIG. 7 is a sequence diagram that illustrates a destination initiated copy back process in further embodiments.

FIG. 7 shows another sequence diagram for a destination initiated copy back operation. The arrangement of FIG. 7 can be used in cases where the storage array controller 152 determines that the source (first) storage device 110A is undergoing degraded performance, such as through the monitoring of SMART (self-monitoring, analysis and reporting technology) data from the first storage device. In the example of FIG. 7, a determination is made by the storage array controller 152 to transfer the data stored on the first storage device 110A to the second device 110B, the latter of which may be available from a spare pool, etc.

In FIG. 7, a copy back command is issued to the second storage device 110B by the array controller 152. In this case, the copy back command is similar to the exemplary command in FIG. 4, except that the second storage device 110B is notified of the address identifier of the first storage device 110A. In response, the second storage device 110B issues a second copy back command to the first storage device 110A with its own destination address, and a data transfer is commenced in which the requested data are transferred from the first device to the second device.

As before, the storage array controller 152 may periodically query the status of the data transfer. In this case, the controller may forward the status request(s) to the second storage device rather than the first storage device. Once completed, the array controller will notify the host that the copy back operation has concluded.

Figure 8:
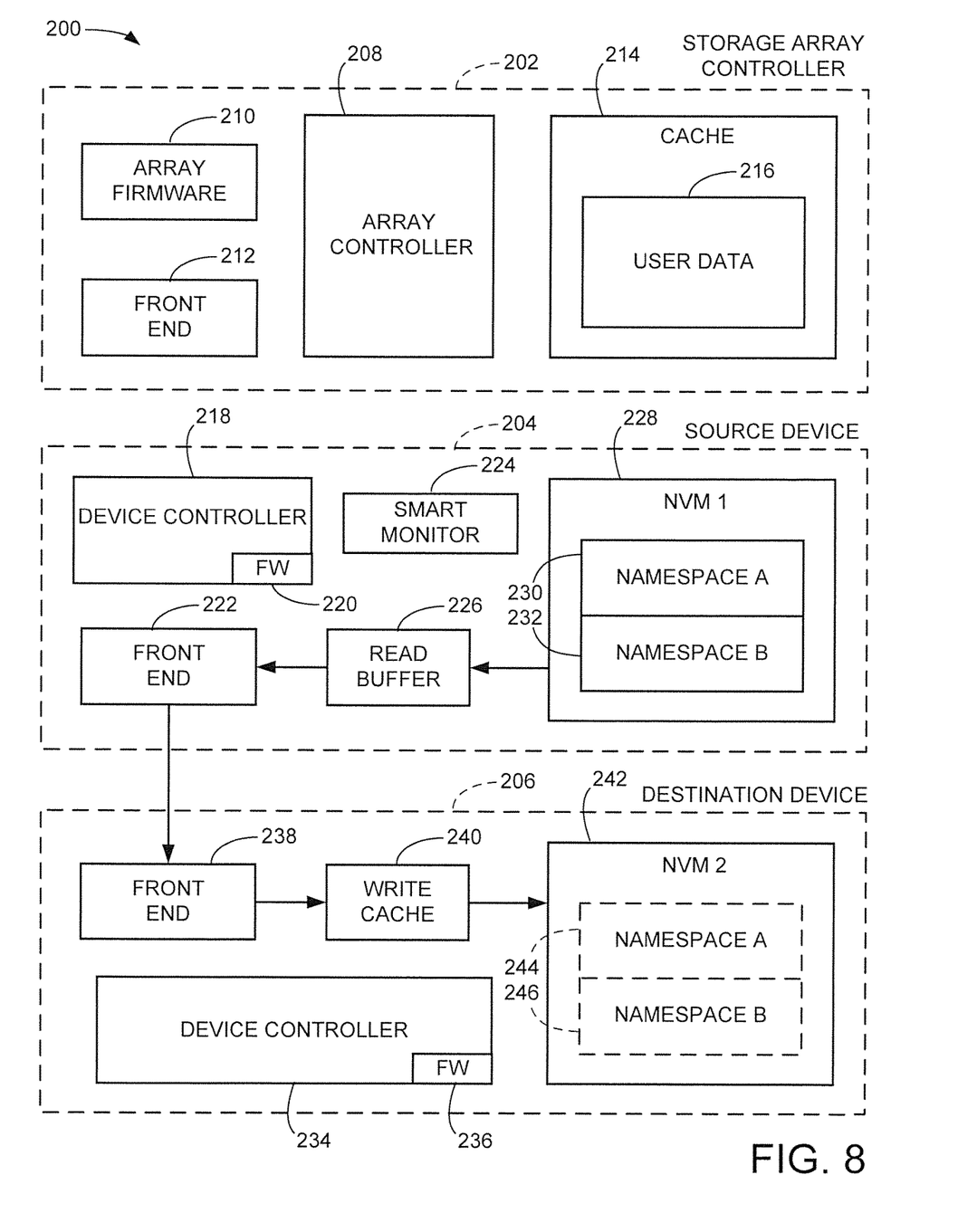
FIG. 8 shows another storage array constructed and operated in accordance with further embodiments.

FIG. 8 shows aspects of another storage array 200 in accordance with some embodiments. The system 200 includes a storage array controller device 202, a source device 204 and a destination device 206. These devices generally correspond to the devices discussed above in FIG. 3.

It is contemplated that the source and destination devices 204, 206 are nominally identical SSDs, although other arrangements can be used. For example, the source and destination devices can be different types of data storage devices such as the source device being an SSD and the destination device being an HDD, etc. In this latter case, the copy back operation can constitute a data migration operation (e.g., cold storage, archival, etc.) to move selected data to slower memory.

The storage array controller device 202 includes a number of operative elements including a storage array controller circuit (array controller) 208, array firmware 210, a front end 212 and a cache memory 214. The cache memory 214 stores one or more sets of user data 216. The array controller 208 includes one or more programmable processor circuits to carry out top level data management operations. The array firmware 210 is executed by the array controller 208 and includes the copy back command initiation capabilities discussed above.

The front end 212 represents the interface circuitry and physical elements used by the storage array controller device 202 to communicate with the source and destination devices 204, 206, as well as other devices in the storage array 200 over one or more suitable interfaces. This is contemplated as comprising one or more PCIe busses using the SCSI command set in accordance with the NVMe specification, although this is not limiting.

The cache 214 constitutes volatile and/or non-volatile memory configured to store the user data during data transfer operations of the user data between an external client (e.g., NVMe user, etc.) and the respective devices 204, 206.

The source device 204 includes a device (e.g., SSD) controller 218 with associated firmware (FW) 220, a front end 222, a SMART monitor 224, a read buffer 226 and a first non-volatile memory (NVM 1) 228, which in this example is flash memory. The front end 222 communicates with the front end 212 of the storage array controller device 202.

The SMART monitor operates as described above to monitor various parameters of the device 204 during operation and issue notifications when certain parameters are operating out of or approaching an associated threshold sufficient to indicate a potential imminent failure may occur. The read buffer 226 comprises volatile and/or non-volatile memory adapted to temporarily store data retrieved from the flash memory 228.

The flash memory is partitioned into two NVMe namespaces 230, 232, respectively referred to as Namespaces A and B. Each of the namespaces is assigned to a different user for the storage of user data thereto. The data stored to each namespace may be processed differently, such as through the use of different user authentication credentials that need to be presented to the storage device by each of the users, different encryption keys and other cryptographic values to respectively encrypt the data, etc.

The destination device 206 shows different operative elements, but is otherwise contemplated as being nominally identical to the source device 204 in the present example. The destination device 206 includes a device (SSD) controller 234 with associated firmware (FW) 236, a front end 238, a write cache 240 and non-volatile memory (NVM2) 242, also characterized as flash memory. The front end 238 communicates with the other front ends in the system. The write cache may be volatile or non-volatile memory used to store data in the form of accumulated blocks pending writing to the flash memory 242.

A copy back operation is initiated by the array controller 208 forwarding, via the front end 212, a copy back command to either the source or destination device 204, 206 as discussed above in FIGS. 6-7. In the present case, it is contemplated that the command instructs the source device 204 to copy the contents of the respective namespaces 230, 232 to the flash memory 242 of the destination device 206, thereby replacing these namespaces 230, 232 with newly formed namespaces 244, 246 in the flash memory 242. However, other arrangements are contemplated, such as just copying Namespace A to the second device, etc.

The data path flow in FIG. 8 passes from NVM1 228, to the read buffer 226, to the front end 222, to the front end 238, to the write cache 240, to the NVM2 242. As required, the data are processed such as through LDPC decoding, decryption and encryption, etc.

In some embodiments, the data in the NVM1 228 may be encrypted a first time using a user level encryption key and a second time using a local device encryption key, where the local device encryption key is different for each storage device. In such case, the source device 204 may operate to decrypt the data using the source device local device encryption key, and the destination device 206 may subsequently encrypt the data using the destination device local device encryption key.

Figure 9:
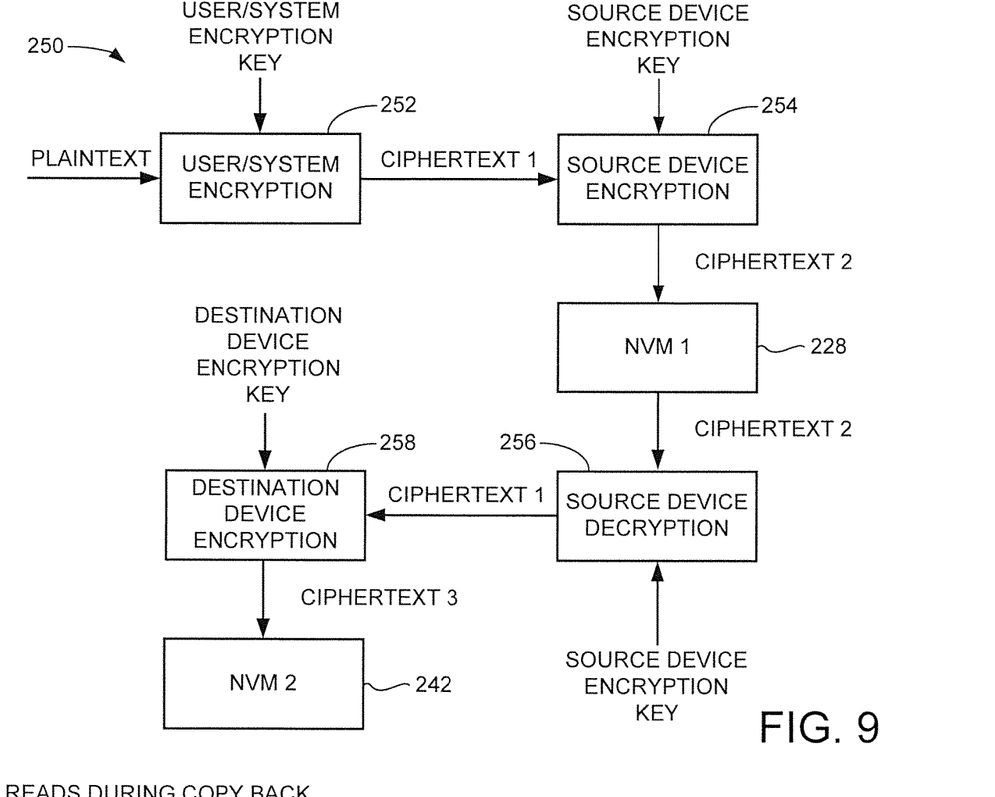
FIG. 9 illustrates an encryption and decryption sequence carried out by the devices of FIG. 8 in some embodiments.

Such operation is illustrated in FIG. 9, which shows a cryptographic processing system 250 of the storage system 200 in some embodiments. A user level and/or system level encryption block 252 uses a symmetric encryption algorithm to convert input plaintext (e.g., user data) to a first set of ciphertext (Ciphertext 1) using a user/system encryption key. While not limiting, this encryption may take place at the user (client) device so that the data provided to the system 200 is already in encrypted form.

The encrypted ciphertext is presented to the source device 202 for a second level of encryption using a source device encryption block 254. The block 254 is a circuit that may correspond to the encryption block 132 in FIG. 2 and can be realized using hardware/software/firmware as required. The block 254 provides a second set of ciphertext (Ciphertext 2) that is thereafter, using further processing, stored to the flash memory (NVM 1) 228 of the source device. These steps are carried out when the data are initially stored to the source device 204.

During the copy back processing, the data are decrypted using a source device decryption block 256 using the source device encryption key. This is shown as a separate block but may constitute the same circuitry as block 254. This operation recovers the first ciphertext (Ciphertext 1) which is then encrypted using a destination device encryption block 258 of the destination device 206 and a destination device encryption key. This generates a third set of ciphertext (Ciphertext 3) which is then processed and stored in the flash memory (NVM 2) 242 of the destination device 206.

It is possible that subsequent access (e.g., host read and write) commands may be issued by the storage array controller for the data blocks being transferred during the copy back operation. These commands can be handled in a variety of ways. In some cases, the commands may be held until the copy back operation is completed; that is, the data are locked until being released by the conclusion of the copy back operation. In other cases, such as in cloud computing environments where multiple replica sets of data are maintained in different geographic regions, the appropriate accessor agents (e.g., software routines) may be notified that the local replica is unavailable for use, so that the system pulls the data using another replica elsewhere in the system. Still other options are shown by FIGS. 10 and 11 where the requests are serviced by the devices involved in the copy back operation.

Figure 10:
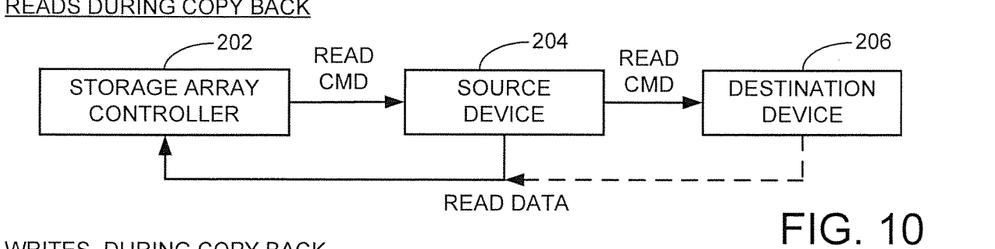
FIG. 10 illustrates read operations that are serviced during a copy back operation in some embodiments.
Figure 11:
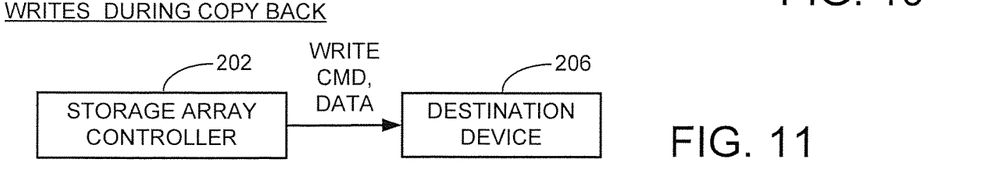
FIG. 11 illustrates write operates that are serviced during a copy back operation in some embodiments.

FIG. 10 shows the processing of read commands during a copy back operation. Until the copy back operation is completed, the source device 204 will still be identified by the storage array controller as the device that is storing the requested data. In such case, in some embodiments the storage array controller 202 forwards the read command to the source device as with a normal read command.

Because the source device is already reading the data for transfer to the destination device, the data may already be resident in the local read buffer (226, FIG. 8), so a cache hit may be possible. Alternatively, the source device may schedule and execute the read command from the flash memory irrespective of whether the data have already been pulled for, or transferred to, the destination device.

In still another case, the source device may determine that the addresses of the blocks requested by the array controller fall within the range of blocks to be transferred to the destination device, in which case the source device may operate to schedule and service the storage array controller read command, followed by formatting the cached readback data and forwarding the data to the destination device as well.

Alternatively, in some cases it may be desirable to have the source device 204 forward the read command to the destination device 206, in which case the destination device returns the data as shown.

The servicing of write commands is shown in FIG. 11. As before, the write command can be issued to the source device on the basis that, until the copy back operation is completed, the source device is the proper location for the command. This presents an easy management scheme since the source device will recognize that the updated blocks are a newer version of data, and so the data transferred to the destination device can be serviced from the write cache (240, FIG. 8) of the source device 204.

However, in an alternative embodiment, since the array controller 208 initiated the copy back operation, the array controller can issue the write command (and the writeback data) directly to the destination device 206. One caveat using this approach is that the destination device 206 may receive this write command prior to receiving a corresponding write command from the source device 204 for the associated range of data blocks.

Normally, storage devices use time stamps and other anti-collision mechanisms to ensure that later received blocks have priority over earlier received blocks. However, if the copy back firmware distinguishes between normal access commands and copy back transfer commands, the destination device 206 can proceed to write the received blocks and then jettison the older blocks received from the source device.

Figure 12:
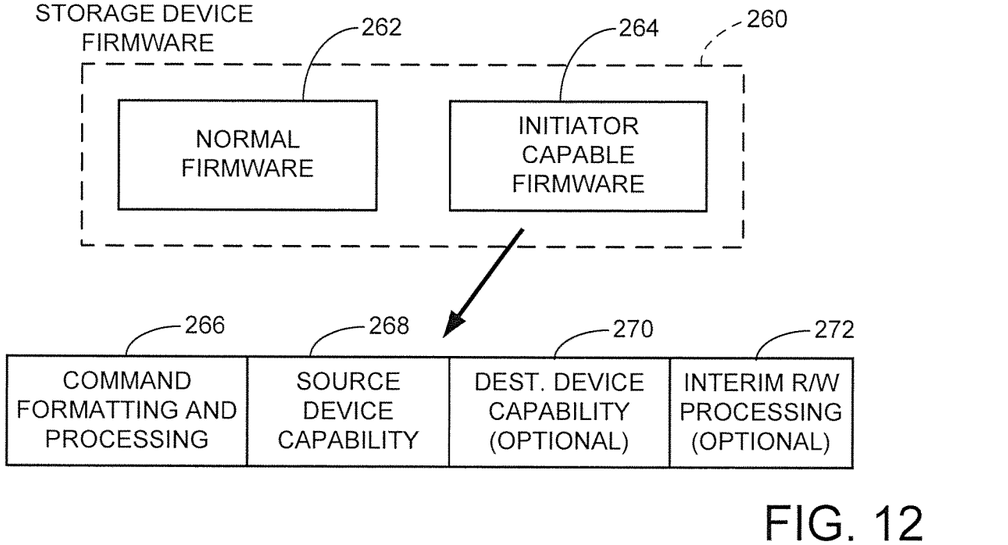
FIG. 12 shows a firmware configuration for an initiator capable data storage device in some embodiments.

FIG. 12 is a block diagram to illustrate an arrangement of storage device firmware 260 of an initiator capable device, such as the SSDs 204, 206 in FIG. 8. The firmware 260 includes so-called normal firmware 262 that is configured to process normal read and write commands from the associated array controller (e.g., device 202 in FIG. 8).

The firmware 260 further includes so-called initiator capable firmware 264 that provides the additional capabilities described above. These can include various operative modules in the form of programming steps stored in memory such as a command formatting and processing module 266 that is adapted to issue and interpret inter-device communications during a copy back operation. This may include special headers or other information to enable the devices to identify and track the data exchanges.

A source device capability module 268 generally describes the functionality added to the device to enable the initialization of a copy back command. An optional destination device capability module 270 similarly configures the device to be able to operate to receive and respond to a copy back command and associated data transfers.

The firmware 260 may be configured such that no separate programming is required to enable the device to operate as a destination device; that is, the destination device capability module 270 in FIG. 12 is optional in at least some cases. This is because the destination device operates in a normal fashion irrespective of whether the data transfer is coming from the array controller or a source device. However, as discussed above, in some cases it may be advantageous to enable the destination device to recognize the write operations are the result of a copy back operation from a particular source device, as certain efficiencies may be realized in the process as discussed above.

Finally, FIG. 12 shows another optional module 272 directed to interim read/write (R/W) processing capabilities. This represents those cases where the destination device is configured to detect and optimize the copy back operation including the processing of other normal access commands from the array controller.

Figure 13:
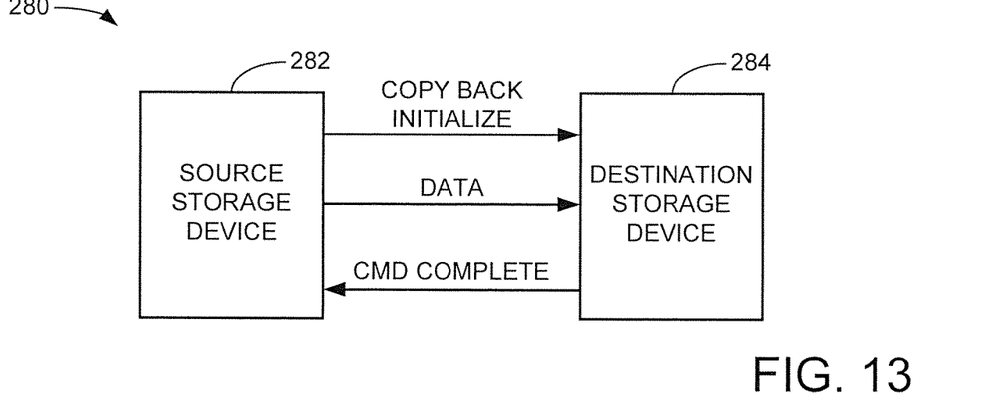
FIG. 13 shows another storage array operable in some embodiments.

FIG. 13 shows aspects of another storage array 280 in accordance with further embodiments. In this case, a source device 282 initializes the copy back command directly with a peer destination storage device, followed by the data transfer and command complete as discussed above. This implies the decision making on whether to initiate the copy back is not necessarily required to come from a storage array controller, but can come from another source, including the storage device 282 itself. For example, in some embodiments the various devices may be supplied with sufficient intelligence that a given storage device, based on an input from a SMART monitoring circuit or similar, initiate a self-transfer of data to a destination device.

Figure 14:
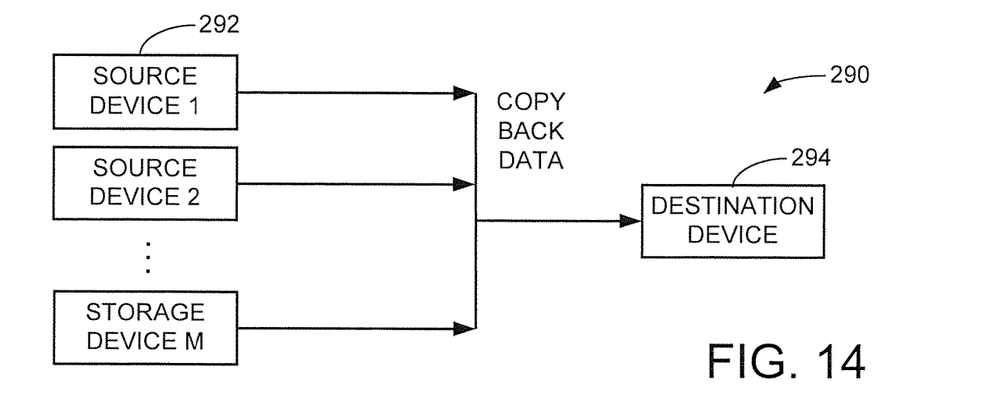
FIG. 14 shows yet another storage array operable in some embodiments.

Finally, FIG. 14 shows yet another storage array 290 in accordance with further embodiments. The discussion thus far has contemplated a one-to-one correspondence of the copy back operation from a single source device to a single destination device. In other embodiments, multiple source devices 292 (in this case, a plural number M source devices) can operate concurrently to copy data to a destination device 294.

The total amount of combined data transferred from the source devices 292 should not exceed the total storage capability of the destination device 294. Nevertheless, this type of operation can be useful in a number of operations, such as a consolidation of a distributed name space, the reconstruction of data in a RAID environment at the drive level, etc.

While not separately illustrated, it will be appreciated that the data flow in FIG. 14 can be reversed so that a copy back operation from a single source device (in this case, the destination device 294) can be used to transfer data to multiple destination devices (in this case, the source devices 292). More generally, any number of source devices can copy back data to any number of destination devices as desired using the various techniques described herein.

The foregoing embodiments can provide a number of advantages. Peer-to-peer data transfers can be carried out efficiently without requiring intervention by system resources such as an array controller processor or cache memory. Separate back channel external data path structures can be used as needed to carry out the data transfers, although it is contemplated that the copy back data will use the normal front end channels used for normal data transfers. Encryption keys or other processing values necessary to access the data can be passed from the source device to the destination device, as well as authentication scripts, etc.

While embodiments have been described in the environment of an SSD, such is not limiting as any form of NVM memory, such as rotatable media, hybrid devices, etc. can be used. Other forms of solid-state memory can be used including but not limited to spin-torque transfer random access memory (STRAM), resistive random access memory (RRAM), phase change random access memory (PCRAM), magnetic random access memory (MRAM), battery or capacitor backed up memory (e.g., NVRAM, DRAM, SRAM), etc.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method comprising:
   configuring a storage array controller circuit to transfer data sets between an array cache memory and respective first, second, and third storage devices using an external data path, each of the first, second, and third storage devices having a device controller circuit, a device non-volatile memory (NVM) and a unique device identifier (ID) value;
   forwarding a copy back transfer command from the first storage device that identifies the device ID of the second storage device and a selected data set stored in the device NVM of a third storage device;
   decrypting the selected data set with the storage array controller circuit using an encryption key associated with the third storage device to form a decrypted data set; and
   transferring, responsive to the copy back transfer command, the decrypted data set from the device NVM of the third storage device directly to the device NVM of the second storage device over the external data path using a peer-to-peer connection between the second and third storage devices that bypasses the array cache memory and any other data storage connected to the external data path.

2. The method of claim 1, wherein the copy back transfer command is forwarded by the storage array controller circuit to the device controller circuit of the first data storage device to initiate the transfer of the selected data set as a copy back operation.

3. The method of claim 1, wherein the copy back transfer command is forwarded by the second storage device to the third storage device to initiate the transfer of the selected data set as a copy back operation.

4. The method of claim 1, further comprising coupling a storage array controller device to the first and second data storage devices using the external path, the storage array controller device comprising the storage array controller circuit and the array cache memory, each of the first and second data storage devices communicating with storage array controller device using an associated front end circuit.

5. The method of claim 1, further comprising transferring a second selected data set between the array cache memory and at least a selected one of the device NVMs of the first, second, and third storage devices during the transfer of the selected data set responsive to a normal mode access command issued by the storage array controller circuit.

6. The method of claim 1, further comprising receiving an indication, by the storage array controller circuit from the third storage device, of a potential failure condition associated with the third storage device, and wherein the storage array controller circuit issues the copy back transfer command to the third storage device responsive to the indication.

7. The method of claim 1, wherein the storage array controller circuit comprises at least one programmable processor having associated programming in a memory configured to forward the copy back transfer command to the third storage device to initiate the transfer of the selected data set as a copy back operation, wherein the device controller circuit of the third storage device comprises at least one programmable processor having associated programming in a memory configured to direct a read operation upon the device NVM of the third storage device to retrieve and process the selected data set and to forward the retrieved and processed selected data set as a copy back data set to the second storage device, and wherein the device controller circuit of the second storage device comprises at least one programmable processor having associated programming in a memory configured to receive and process the copy back data set for storage in the device NVM of the second storage device.

8. The method of claim 7, wherein the device controller circuit of the third storage device is further configured to decrypt the selected data set from the device NVM of the third storage device using a first encryption key associated with the third storage device to generate the copy back data set, and wherein the device controller circuit of the second storage device is further configured to encrypt the copy back data set using a different, second encryption key associated with the second storage device prior to storage in the device NVM of the second storage device.

9. The method of claim 1, wherein the storage array controller circuit and the array cache memory constitute a storage array controller device configured to stripe data sets across a plurality of storage devices including the first and second storage devices, wherein each of the first and second storage devices comprises a solid state drive (SSD), and wherein each of the device NVMs of the first and second storage devices comprises flash memory.

10. A data storage device comprising:
a non-volatile memory (NVM) of a first data storage device;
a front end circuit coupled to an external data path; and
a controller circuit configured to direct data transfers between the NVM and an array cache memory of a storage array controller circuit via the front end circuit and the external data path during a normal mode of operation, the controller circuit further configured to decrypt a selected data set from the NVM of a first data storage device using an encryption key associated with the first data storage device to form decrypted data set and subsequently transfer the decrypted data set from the NVM directly to a second data storage device via the front end circuit and the external data path using a peer-to-peer connection that bypasses the array cache memory of the storage array controller circuit and any other data storage connected to the external data path during a copy back mode of operation responsive to receipt, by the controller circuit, of a copy back transfer command from a third data storage device that identifies a logical address of the selected data set and a unique identifier (ID) value associated with the second data storage device.

11. The data storage device of claim 10, wherein the NVM is arranged into at least one NVMe (Non-Volatile Memory Express) namespace in accordance with the NVMe specification, and wherein the selected data set comprises an entirety of user data stored in at least a selected one of the at least one NVMe namespace of the NVM.

12. The data storage device of claim 10, wherein the selected data set is characterized as a first data set, and wherein the controller circuit is further configured to transfer a second data set between the NVM and the array cache memory using the normal mode of operation during the transfer of the first data set between the NVM and the second storage device using the copy back mode of operation.

13. The data storage device of claim 10, characterized as a solid state drive (SSD), wherein the controller circuit comprises at least one programmable processor having associated programming instructions stored in a memory and the NVM comprises flash memory.

14. The data storage device of claim 10, wherein the controller circuit is further configured to, responsive to the copy back transfer command, transfer, via the front end circuit and the external data path, the decrypted data set to the third data storage device.

15. The data storage device of claim 10, further comprising a SMART (self-monitoring and reliability testing) circuit configured to monitor at least one parameter during operation of the first data storage device, wherein the controller circuit is further configured to initiate the copy back mode of operation responsive to an indication from the SMART circuit of a potential failure condition associated with the first data storage device.

16. A storage array, comprising:
a plurality of data storage devices each having a device controller circuit, an associated non-volatile memory (NVM) and a unique identifier (ID) value;
a storage array controller circuit device coupled to each of the plurality of data storage devices using an external data path, the storage array controller circuit device comprising a storage array controller circuit and an array cache memory, the storage array controller circuit configured to operate in a normal mode of operation and in a copy back mode of operation, the normal mode of operation comprising a normal transfer of first data between the array cache memory and the NVM of selected ones of the plurality of data storage devices responsive to data transfer commands issued by the storage array controller circuit to the device controller circuits, the copy back mode of operation comprising a copy back data transfer in which second data stored in the NVM of a first storage device are transferred directly to the NVM of a second storage device using a peer-to-peer connection between the first and second storage devices that bypasses the array cache memory and any other data storage connected to the external data path, the copy back transfer initiated by the device controller circuit of a third data storage device issuing a copy back transfer command to the device controller circuit of the first data storage device, the copy back transfer command identifying the second data and the unique ID value of the second first data storage device, triggering decryption of the second data into a decrypted data set using an encryption key associated with the first data storage device to form a decrypted data set, and transferring the decrypted data set to the second data storage device.

17. The storage array of claim 16, wherein the copy back transfer command is forwarded by the storage array controller circuit to the device controller circuit of the first data storage device to initiate the transfer of the second data set as a copy back operation, and wherein the storage array controller circuit is further configured to periodically query the first data storage device to determine whether the transfer of the second data has completed.

18. The storage array of claim 16, wherein the copy back transfer command is forwarded by the third storage device to the first storage device to initiate the transfer of the second data set as a copy back operation, and wherein the storage array controller circuit is further configured to periodically query the first data storage device to determine whether the transfer of the second data has completed.

19. The storage array of claim 16, wherein the storage array controller circuit transfers the first data from the array cache memory to at least a selected one of the first or second data storage devices using the normal mode of operation during the transfer of the second data from the first data storage device to the second data storage device during the copy back mode of operation.

20. The storage array of claim 16, wherein during the normal mode of operation the storage array controller encrypts a selected data set received from a user using a first encryption key to form a first ciphertext and directs the first ciphertext to the first data storage device, and the device controller circuit of the first data storage device encrypts the first ciphertext using a second encryption key to form a second ciphertext and stores the second ciphertext in the NVM of the first data storage device, wherein during the copy back mode of operation the device controller circuit of the first data storage device retrieves the second ciphertext from the NVM, decrypts the second ciphertext using the second encryption key to return the first ciphertext and transfers, via a front end circuit over the external data path, the first ciphertext to the second data storage device, and wherein during the copy back mode of operation the device controller circuit of the second data storage device encrypts the first ciphertext received from the first data storage device using a third encryption key to form third ciphertext, stores the third ciphertext in the NVM of the second data storage device, and returns a command complete indication to the device controller circuit of the first data storage device.

* * * * *